(12) United States Patent
Kim et al.

(10) Patent No.: US 11,429,098 B2
(45) Date of Patent: Aug. 30, 2022

(54) PATH PROVIDING APPARATUS AND PATH PROVIDING METHOD

(71) Applicant: HANWHA DEFENSE CO., LTD., Changwon-si (KR)

(72) Inventors: Byung Ki Kim, Changwon-si (KR); Seong Hun Han, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 104 days.

(21) Appl. No.: 16/698,292

(22) Filed: Nov. 27, 2019

(65) Prior Publication Data

US 2020/0293039 A1   Sep. 17, 2020

(30) Foreign Application Priority Data

Mar. 13, 2019   (KR) .......................... 10-2019-0028855

(51) Int. Cl.
*G05D 1/00* (2006.01)
*G05D 1/02* (2020.01)

(52) U.S. Cl.
CPC ......... *G05D 1/0044* (2013.01); *G05D 1/0027* (2013.01); *G05D 1/0289* (2013.01); *G05D 1/0293* (2013.01)

(58) Field of Classification Search
CPC .. G05D 1/0044; G05D 1/0289; G05D 1/0293; G05D 1/0027; G05D 1/0217; G01C 21/20
See application file for complete search history.

(56) References Cited

U.S. PATENT DOCUMENTS

| | | | | |
|---|---|---|---|---|
| 4,796,189 A | * | 1/1989 | Nakayama | ......... G01C 21/3632 340/990 |
| 2006/0028832 A1 | * | 2/2006 | Horii | ....................... B60Q 1/12 362/514 |
| 2007/0052724 A1 | * | 3/2007 | Graham | ................ G06T 19/003 345/620 |
| 2015/0344030 A1 | * | 12/2015 | Damerow | ......... B60W 30/0956 701/1 |

(Continued)

FOREIGN PATENT DOCUMENTS

| | | | |
|---|---|---|---|
| CN | 103335658 B | * | 9/2016 |
| JP | 3766766 B2 | | 4/2006 |

(Continued)

*Primary Examiner* — Donald J Wallace
(74) *Attorney, Agent, or Firm* — Sughrue Mion, PLLC

(57) ABSTRACT

A path providing apparatus includes a communication interface configured to obtain current location data of a vehicle, receive obstacle data of moving objects, and receive a path finding command including a first location and a second location of the vehicle; and a processor configured to generate a virtual vehicle swarm comprising a plurality of virtual vehicles, generate a plurality of pieces of path prediction data by virtually driving each of the plurality of virtual vehicles on a first map based on the current location data, update the plurality of pieces of path prediction data by virtually driving each of the plurality of virtual vehicles on a second map based on the obstacle data, and generate optimal path data from among the updated plurality of pieces of path prediction data based on the path finding command including the first location and the second location.

20 Claims, 9 Drawing Sheets

(56) References Cited

U.S. PATENT DOCUMENTS

| | | | |
|---|---|---|---|
| 2017/0010618 A1* | 1/2017 | Shashua | G06K 9/00818 |
| 2018/0063261 A1* | 3/2018 | Moghe | H04W 36/0083 |
| 2018/0308371 A1* | 10/2018 | Cao | G08G 5/045 |

FOREIGN PATENT DOCUMENTS

| | | |
|---|---|---|
| JP | 3914460 B2 | 5/2007 |
| KR | 1998-013762 A | 5/1998 |
| KR | 10-1475207 B1 | 12/2014 |
| KR | 10-2017-0055193 A | 5/2017 |

\* cited by examiner

PATH PROVIDING APPARATUS AND PATH PROVIDING METHOD

CROSS-REFERENCE TO RELATED APPLICATION

This application claims priority under 35 U.S.C. § 119 to Korean Patent Application No. 10-2019-0028855, filed on Mar. 13, 2019, in the Korean Intellectual Property Office, the disclosure of which is incorporated herein by reference in its entirety.

BACKGROUND

1. Field

Apparatuses and methods consistent with exemplary embodiments relate to a path providing apparatus and a path providing method, more particularly to a path providing apparatus capable of providing an optimal path based on moving obstacles and a method of the same.

2. Description of the Related Art

Various moving objects including vehicles travel to perform given missions or services. Active research is being made on path planning for providing routes for moving objects from various start locations to destinations in order to quickly complete missions or services of the moving objects.

In dynamic environments with dynamically moving obstacles, it is necessary to promptly provide a path to avoid such obstacles in order for a moving object to avert collisions. However, in a dynamic environment, calculating a path for avoiding such moving obstacles in real time may take too long to avert collisions.

SUMMARY

One or more exemplary embodiments provide an apparatus and method of quickly providing an optimal path based on obstacles.

Additional aspects will be set forth in part in the description which follows and, in part, will be apparent from the description, or may be learned by practice of the exemplary embodiments.

According to an aspect of an exemplary embodiment, there is provided a path providing apparatus including a communication interface configured to obtain current location data of a vehicle, receive obstacle data of moving objects, and receive a path finding command including a first location and a second location of the vehicle; and a processor configured to generate a virtual vehicle swarm including a plurality of virtual vehicles, generate a plurality of pieces of path prediction data by virtually driving each of the plurality of virtual vehicles on a first map based on the current location data, update the plurality of pieces of path prediction data by virtually driving each of the plurality of virtual vehicles on a second map based on the obstacle data, and generate optimal path data from among the updated plurality of pieces of path prediction data based on the path finding command including the first location and the second location.

The obstacle data may include data regarding presence or the absence of a moving object of the moving objects at a predetermined position being detected, and the second map based on the obstacle data may include information on the presence or absence of the moving object at the predetermined position.

The processor may be configured to: extract first path prediction data having a start node that is closest to the first location from among the updated plurality of pieces of path prediction data and generate first path calculation data from the first location to the start node when the first location is not included in the first map or the second map, extract second path prediction data having an end node that is closest to the second location from among the updated plurality of pieces of path prediction data and generate second path calculation data from the end node to the second location when the second location is not included in the first map or the second map, and generate the optimal path data by combining the first and second path prediction data and the first and second path calculation data.

The processor may be configured to generate the optimal path data based on at least one of vector data, moving distance data, moving time data, mission data, or vehicle status data included in each of the plurality of pieces of path prediction data.

The path providing apparatus may further include a memory configured to store driving history data of the vehicle. The processor may be configured to generate the plurality of pieces of path prediction data based on the driving history data by virtually driving each of the plurality of virtual vehicles on the first map based on the current location data and may be configured to update the plurality of pieces of path prediction data by virtually driving each of the plurality of virtual vehicles on the second map based on the obstacle data.

The driving history data may include actual path data generated based on actual driving of the vehicle.

According to an aspect of another exemplary embodiment, there is provided a path providing method including obtaining, by a communication interface, current location data of a vehicle; generating, by a processor, a virtual vehicle swarm including a plurality of virtual vehicles; generating, by the processor, a plurality of pieces of path prediction data by virtually driving each of the plurality of virtual vehicles on a first map based on the current location data; receiving, by the communication interface, obstacle data of a moving object detected on the first map; updating, by the processor, the plurality of pieces of path prediction data by virtually driving each of the plurality of virtual vehicles on a second map based on the obstacle data; receiving, by the communication interface, a path finding command including a first location and a second location of the vehicle; and generating, by the processor, optimal path data from among the updated plurality of pieces of path prediction data based on the path finding command including the first location and the second location.

The obstacle data may include data regarding presence or absence of the moving object at a predetermined position being detected, and the second map based on the obstacle data may include information on the presence or the absence of the moving object at the predetermined position.

Based on at least one of the first location and the second location not being included in the first map or the second map, the generating the optimal path data includes: extracting first path prediction data including a start node that is closest to the first location from among the updated plurality of pieces of path prediction data based on the first location not being included in the first map or the second map; extracting second path prediction data including an end node that is closest to the second location from among the updated plurality of pieces of path prediction data when the second location is not included in the first map or the second map; generating first path calculation data from the first location to the start node based on the first location not being included in the map; generating second path calculation data from the end node to the second location based on the second location not being included in the map; and generating the optimal path data by combining the first and second path prediction data and the first and second path calculation data.

In the generating the optimal path data, the optimal path data may be determined based on at least one of vector data, moving distance data, moving time data, mission data, or vehicle status data included in each of the plurality of pieces of path prediction data.

The path providing method may, further include storing, by a memory, driving history data of the vehicle. In the generating the plurality of pieces of path prediction data, the plurality of pieces of path prediction data are generated based on the driving history data by virtually driving each of the plurality of virtual vehicles on the first map based on the current location data, and in the updating the plurality of pieces of path prediction data, the plurality of pieces of path prediction data are updated based on the driving history data by virtually driving each of the plurality of virtual vehicles on the second map based on the obstacle data.

The driving history data may include actual path data generated based on actual driving of the vehicle According to an aspect of another exemplary embodiment, there is provided a path providing apparatus including a communication interface configured to obtain current location data of a vehicle and receive obstacle data of at least one moving object based on the obtained current location data; and a processor configured to generate a virtual vehicle swarm including a plurality of virtual vehicles, generate a plurality of pieces of path prediction data by virtually driving each of the plurality of virtual vehicles on a first map based on the current location data, and update the plurality of pieces of path prediction data by virtually driving each of the plurality of virtual vehicles on a second map based on the obstacle data. Based on the communication interface receiving a path finding command including a departure location and a destination of the vehicle, the processor may be configured to generate optimal path data for the vehicle from among the updated plurality of pieces of path prediction data.

The obstacle data may include at least one of a position of the at least one moving object and a size of the at least one moving object.

The second map may include a map on which a first obstacle that was not in the first map appears, on which a second obstacle in the first map is relocated, or on which a third obstacle that was present in the first map disappears.

The optimal path data may be determined based on at least one of vector data, moving distance data, moving time data, mission data, or vehicle status data included in each of the plurality of pieces of path prediction data.

The path providing apparatus may further include a memory configured to store driving history data of the vehicle. The processor may be configured to generate the plurality of pieces of path prediction data based on the driving history data by virtually driving each of the plurality of virtual vehicles on the first map based on the current location data and is configured to update the plurality of pieces of path prediction data by virtually driving each of the plurality of virtual vehicles on the second map based on the obstacle data.

The processor may be configured to update the plurality of pieces of path prediction data by virtually driving each of the plurality of virtual vehicles on the second map based on absence of the at least one moving object being detected in the second map.

The absence of the at least one moving object being detected may include the at least one moving object in the first map disappears in the second map or the at least one moving object that was present in the first map has moved.

BRIEF DESCRIPTION OF THE DRAWINGS

The above and/or other aspects of the disclosure will become apparent and more readily appreciated from the following description of the embodiments, taken in conjunction with the accompanying drawings in which.

DETAILED DESCRIPTION

Figure 1:
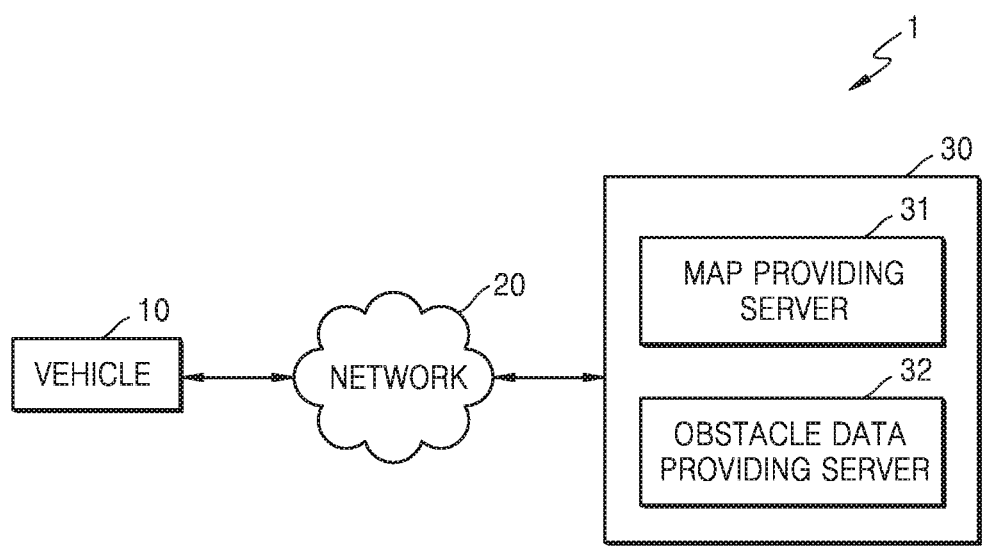
FIG. 1 is a schematic view of a path providing system according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following descriptions merely illustrate the principles of the inventive concept. Thus, one of ordinary skill in the art will be able to devise various apparatuses and methods which, although not explicitly described or shown herein, embody the principles of the inventive concept and various devices included in the concept and scope of the invention. Furthermore, all of the conditional terms and exemplary embodiments listed herein are, in principle, intended only for the purpose of enabling understanding of the concepts of the present invention, and are not intended to be limiting in any way to the specifically listed exemplary embodiments and conditions. It is also to be understood that the detailed description, as well as the principles, aspects and exemplary embodiments of the invention, as well as specific exemplary embodiments thereof, are intended to cover structural and functional equivalents of such matters. It is also to be understood that such equivalents include all elements contemplated to perform the same function irrespective of currently known equivalents as well as equivalents to be developed in the future.

At least one of the components, elements, modules or units (collectively "components" in this paragraph) represented by a block in the drawings such as FIG. 1 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The above objects, features, and advantages will become more apparent from the following detailed description in conjunction with the accompanying drawings. In the following description of the present invention, detailed descriptions of related arts will be omitted or briefly given when it is determined that the gist of the present invention may be unnecessarily obscured.

In addition, unless explicitly described to the contrary, the word "comprise" and variations such as "comprises" or "comprising" will be understood to imply the inclusion of stated elements but not the exclusion of any other elements.

Hereinafter, one or more exemplary embodiments will be described in detail with reference to the accompanying drawings.

FIG. 1 is a schematic view of a path providing system 1 according to an exemplary embodiment.

Referring to FIG. 1, a path providing system 1 includes a vehicle 10, a network 20, and a server 30.

The vehicle 10 may include, but is not limited to, unmanned means of transportation as well as manned means of transportation.

The vehicle 10 may be controlled or driven according to optimal path data generated based on driving history data of the vehicle 10. The optimal path data may be generated based on current location data of the vehicle 10 and obstacle data obtained by the vehicle 10 by itself or may be provided from an outside source. However, exemplary embodiments are not limited thereto.

The vehicle 10 may be equipped with a global position system (GPS) module. The vehicle 10 may obtain the current location data of the vehicle 10 dynamically from a GPS satellite via the GPS module.

The vehicle 10 may communicate with the server 30 via the network 20.

The vehicle 10 may be provided with a map including and/or generated based on the current location data of the vehicle 10 from a map providing server 31 of the server 30. For example, the vehicle 10 may transmit the current location data obtained from the GPS module to the map providing server 31 and may receive a map of an area including and/or generated based on the current location data of the vehicle 10 from the map providing server 31.

The vehicle 10 may also be provided with obstacle data regarding moving objects detected on the map around the vehicle 10 from an obstacle data providing server 32 of the server 30. For example, the vehicle 10 may transmit the current location data of the vehicle 10 obtained from the GPS module to the obstacle data providing server 32 and receive the obstacle data regarding moving objects detected within a predetermined range from the vehicle 10 based on the current location data from the obstacle data providing server 32. For example, the obstacle data providing server 32 of the server 30 may be provided with a map of a certain region including and/or generated based on the current location data of the vehicle 10 from the map providing server 31 and provide obstacle data regarding moving objects detected in the map within the predetermined range from the vehicle 10 to the vehicle 10.

The vehicle 10 may receive optimal path data corresponding to a path finding command including a departure location (i.e., a start location or a first location) of the vehicle 10 and a destination location (or a second location) of the vehicle 10 from the server 30.

Hereinafter, an operation of a path providing apparatus 200 according to one or more exemplary embodiments will be described in detail. The path providing apparatus 200 according to one or more exemplary embodiments may be implemented as one physical device or may be implemented as an organic combination of a plurality of physical devices. To this end, some of the components included in the path providing apparatus 200 may be implemented or installed as any one physical device, and the other components may be implemented or installed as other physical devices. At this time, each physical device constituting the path providing apparatus 200 may be implemented as a part of at least one of the vehicle 10 and the server 30.

Figure 2:
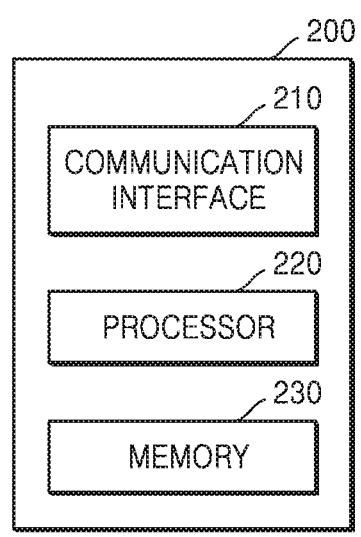
FIG. 2 is a block diagram schematically showing the configuration of a path providing apparatus according to an exemplary embodiment.

FIG. 2 is a block diagram schematically illustrating a configuration of a path providing apparatus 200 according to an exemplary embodiment.

Referring to FIG. 2, a path providing apparatus 200 includes a communication interface 210, a processor 220, and a memory 230.

The communication interface 210 obtains current location data (including the current location) of an actual vehicle (or a vehicle), receives obstacle data regarding moving objects detected on a map, receives a path finding command including a departure location of the actual vehicle and a destination of the actual vehicle, and provides optimal path data for the actual vehicle based on the path finding command.

The actual vehicle is a vehicle distinguished from virtual vehicles. The actual vehicle is the subject of driving history data, which is actually measured path data in association with actual driving, and may be actually driven according to optimal path data.

The communication interface 210 may obtain current location data of the actual vehicle through a GPS module, but one or more exemplary embodiments are not limited thereto.

A map may represent the current location data. For example, a map may represent a region within a certain range from the current location of the actual vehicle.

A moving object may refer to an object where a position of the object changes over time. The presence, movement, or absence of a moving object may be detected on a map based on a time point at which path prediction data is generated by the processor 220.

Obstacle data may be data related to presence or absence at a certain position of a moving object being detected. Obstacle data may be detected on a map being based on current location data of the actual vehicle 10. A certain position may correspond to an entire map or a certain point within the map, but the exemplary embodiment is not limited thereto.

Obstacle data may be data representing at least one of a position of the moving object and a size of the moving object. The position of the moving object may be a coordinate information indicating the center of the moving object or a set of coordinates indicating the boundary of the moving object. However, the exemplary embodiment is not limited thereto.

The communication interface 210 may receive a path finding command including a departure location (a first location) and a destination (a second location) of the actual vehicle 10. For example, the communication interface 210 may receive a path finding command including, for example, the departure location (the first location) and the destination (the second location) of the actual vehicle 10 from a user terminal. For example, the communication interface 210 may receive a path finding command from a user interface.

The departure location and the destination may be locations within a map generated based on current location data. When the departure location and the destination are included in the map generated based on the current location data, optimal path data may be determined only based on path prediction data.

On the other hand, the departure location and the destination may not be located within a map generated based on the current location data. When the departure location and the destination are not located within a map generated based on the current location data, optimal path data may be determined from a combination of path prediction data and path calculation data.

The processor 220 generates a virtual vehicle swarm including a plurality of virtual vehicles, generates a plurality of pieces of path prediction data by virtually driving each of the plurality of virtual vehicles in a map including and/or generated based on current location data, updates the plurality of pieces of path prediction data by virtually driving each of the plurality of virtual vehicles on a map generated based on the above-described obstacle data, and determines an optimal path (or optimal path data) from among the updated plurality of pieces of path prediction data based on the departure location and the destination.

A virtual vehicle swarm may be generated based on current location data being obtained or may be generated regardless of whether current location data is obtained or not.

A virtual vehicle swarm may include a plurality of virtual vehicles that are simultaneously driven on the map. Path prediction data may be a result that a virtual vehicle included in the virtual vehicle swarm is virtually driven on a map including and/or generated based on current location data.

On the other hand, a virtual vehicle may be virtually driven based on driving history data of an actual vehicle. For example, the processor 220 may generate a plurality of pieces of path prediction data by virtually driving a plurality of virtual vehicles on a map including and/or generated based on current location data based on driving history data of an actual vehicle.

The driving history data may be actual path data according to actual driving of an actual vehicle. The driving history data may be, for example, data reflecting driving habits of a driver of the actual vehicle that is actually driven.

According to one or more exemplary embodiments, a virtual vehicle swarm is used, and thus path data may be provided faster than in a case where path data is generated in real time.

Also, according to one or more exemplary embodiments, actual path data is used, and thus path data most suitable for actual driving of an actual vehicle may be provided.

A map reflecting obstacle data may be a map reflecting the presence or absence of at least one moving object provided at a certain position. For example, a map reflecting obstacle data may be a map on which an obstacle that was not in a map generated based on the current location data appears, an obstacle in the map generated based on the current location data is relocated, or an obstacle that was present in the map generated based on the current location data disappears.

The map reflecting the current location data and the map reflecting the obstacle data may be the background in which a virtual vehicle swarm is virtually driven. Path prediction data in the map (a first map) generated based on the current location data and path prediction data in the map (a second map) generated based on the obstacle data may be different from each other.

The processor 220 may update a plurality of pieces of path prediction data by virtually driving a plurality of virtual vehicles based on driving history data of an actual vehicle on a map reflecting or generated based on obstacle data.

According to one or more exemplary embodiments, because obstacle data is used, more accurate path data based on the obstacles may be provided.

The processor 220 may determine optimal path data from among a plurality of pieces of available path prediction data. For example, when obstacle data is not received or not available, the processor 220 may determine optimal path data (or an optimal path) from among a plurality of pieces of path prediction data generated based on a map including and/or generated based on current location data. When the obstacle data is available and received, the processor 220 may determine optimal path data (or an optimal path) from among a plurality of pieces of path prediction data generated based on a map reflecting or generated based on the obstacle data.

The processor 220 may determine whether a departure location and a destination are included in a map.

When a departure location is not included in a map, the processor 220 may extract path prediction data having a start node that is the closest to the departure location from among a plurality of pieces of available path prediction data and generate path calculation data from the departure location to the start node. When a destination is not included in the map, the processor 220 may extract path prediction data having an end node that is the closest to the destination from among a plurality of pieces of available path prediction data and generate path calculation data from the end node to the destination.

At this time, the path prediction data may be pre-set path data, and the path calculation data may be real time path data.

The plurality of pieces of available path prediction data may be a plurality of pieces of path prediction data generated based on a map including and/or generated based on current location data when no obstacle data is received and may be a plurality of pieces of path prediction data generated based on a map reflecting the obstacle data when the obstacle data is received.

The processor 220 may determine optimal path data by combining path prediction data and path calculation data.

For example, when a departure location is not included in a map, the processor 220 may determine optimal path data by combining path calculation data from the departure location to a start node and path prediction data from the start node to a destination.

In addition, for example, when a destination is not included in a map, the processor 220 may determine optimal path data by combining path prediction data from a departure location to an end node and path calculation data from the end node to the destination.

Further, for example, when both a departure location and a destination are not included in a map, the processor 220 may determine optimal path data by combining path calculation data from the departure location to a start node, path prediction data from the start node to an end node, and path calculation data from the end node to the destination.

According to one or more exemplary embodiments, because path prediction data and path calculation data are used in combination, path data may be provided more accurately and quickly.

The processor 220 may determine optimal path data based on at least one of vector data, moving distance data, moving time data, mission data, or vehicle status data included in each of a plurality of pieces of path prediction data.

The vector data may include at least one of distance data from a start point to an end point or direction data from the start point toward the end point. The path prediction data may include at least one piece of vector data.

The moving distance data may be data representing a sum of moving distances from a start node to an end node of path prediction data.

The moving time data may be data representing a sum of moving duration from the start node to the end node of the path prediction data. The moving time data may differ even for the identical moving distance data. For example, even when the sum of the moving distances is the same, the sum of the moving times may vary depending on slopes of terrains, states of road surfaces, and speed limits.

The mission data may include at least one of mission performing location data or mission performing time data.

The vehicle status data may be, but is not limited to, data including, for example, the amount of fuel remaining in an actual vehicle.

For example, the processor 220 may determine optimal path data based on an average value of at least one of vector data, moving distance data, moving time data, mission data, or vehicle status data included in each path prediction data.

For example, the processor 220 may determine optimal path data based on a result of applying a predetermined weight to and summing at least one of vector data, moving distance data, moving time data, mission data, or vehicle status data included in each path prediction data. Different weights may be applied to vector data, moving distance data, moving time data, mission data, or vehicle status data, respectively.

The memory 230 may store driving history data of an actual vehicle.

The memory 230 may store path prediction data in the map including and/or generated based on the current location data and path prediction data in the map reflecting and/or generated based on the obstacle data.

For example, the memory 230 may update path prediction data in a map including and/or generated based on the current location data to path prediction data in a map reflecting obstacle data. In other words, the memory 230 may delete path prediction data in the map including and/or generated based on the current location data and newly store path prediction data in the map reflecting and/or generated based on the obstacle data.

In another example, the memory 230 may separately store path prediction data in the map including and/or generated based on the current location data to path prediction data in the map reflecting and/or generated based on the obstacle data.

According to one or more exemplary embodiments, path data that is the most suitable for actual driving of an actual vehicle may be provided.

Furthermore, according to one or more exemplary embodiments, path data may be provided more quickly.

Furthermore, according to one or more exemplary embodiments, path data may be provided more accurately.

Figure 3:
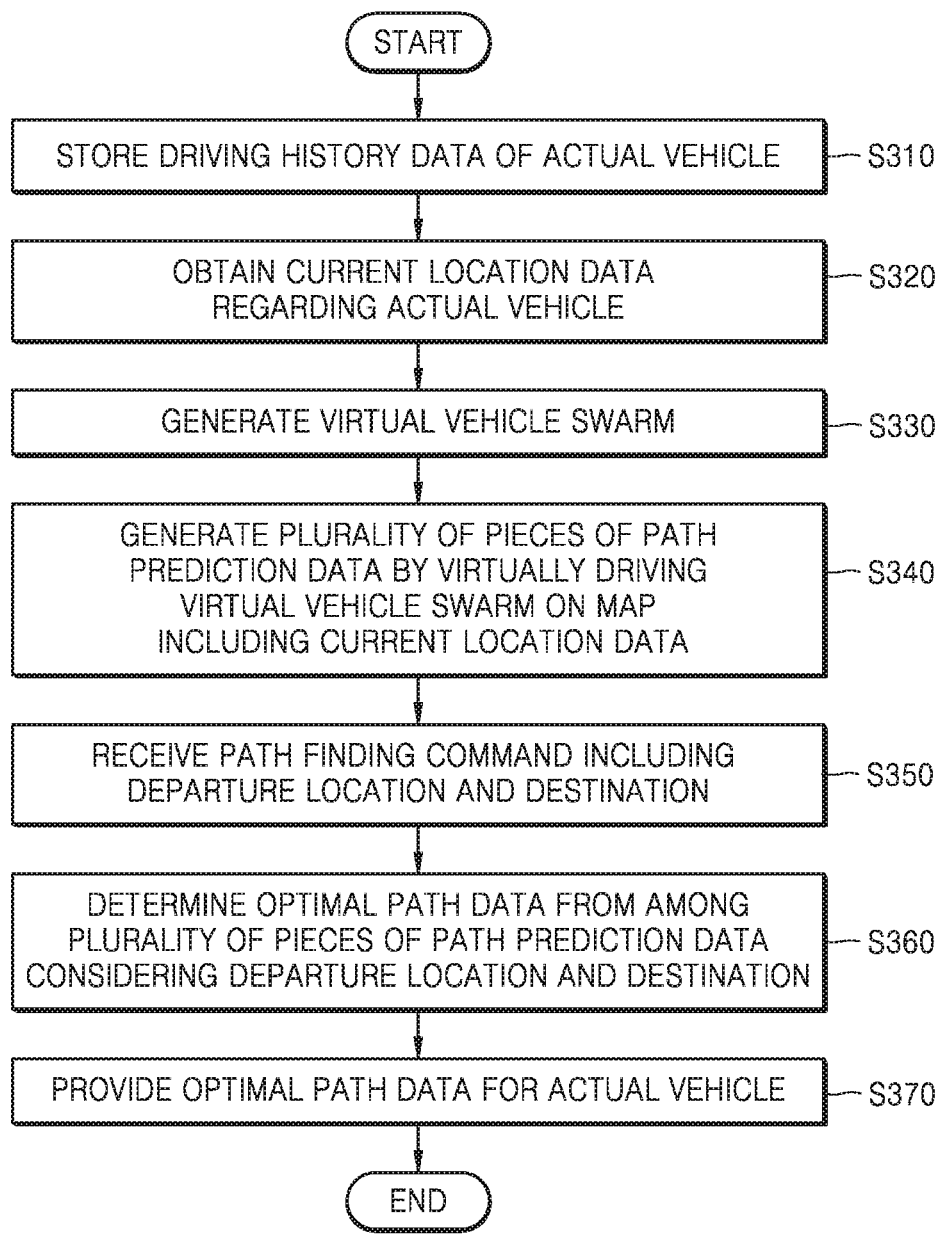
FIG. 3 is a flowchart of a path providing method according to an exemplary embodiment.

FIG. 3 is a flowchart of a path providing method according to an exemplary embodiment.

Referring to FIGS. 2 and 3, a path providing apparatus 200 stores driving history data of an actual vehicle in memory 230 (operation S310). The memory 230 may classify and store driving history data for respective parts of the actual vehicle detected by sensors or the like.

The communication interface 210 of the path providing apparatus 200 obtains current location data of the actual vehicle (operation S320).

Next, the processor 220 of the path providing apparatus 200 generates a virtual vehicle swarm including a plurality of virtual vehicles (operation S330). The processor 220 may generate a virtual vehicle swarm regardless of driving status of the actual vehicle. In other words, the processor 220 may generate a virtual vehicle swarm without the actual vehicle being driven or may generate a virtual vehicle swarm while the actual vehicle is being driven.

The processor 220 generates a plurality of pieces of path prediction data by virtually driving a plurality of virtual vehicles included in the virtual vehicle swarm on a map including and/or generated based on the current location data (operation S340).

At this time, the processor 220 may generate the plurality of pieces of path prediction data based on driving history data stored in the memory 230 by virtually driving the plurality of virtual vehicles on the map including and/or generated based on the current location data.

Hereinafter, a virtual vehicle swarm and generation of a plurality of pieces of path prediction data according to virtual driving of the virtual vehicle swarm will be described with reference to FIG. 4.

Figure 4:
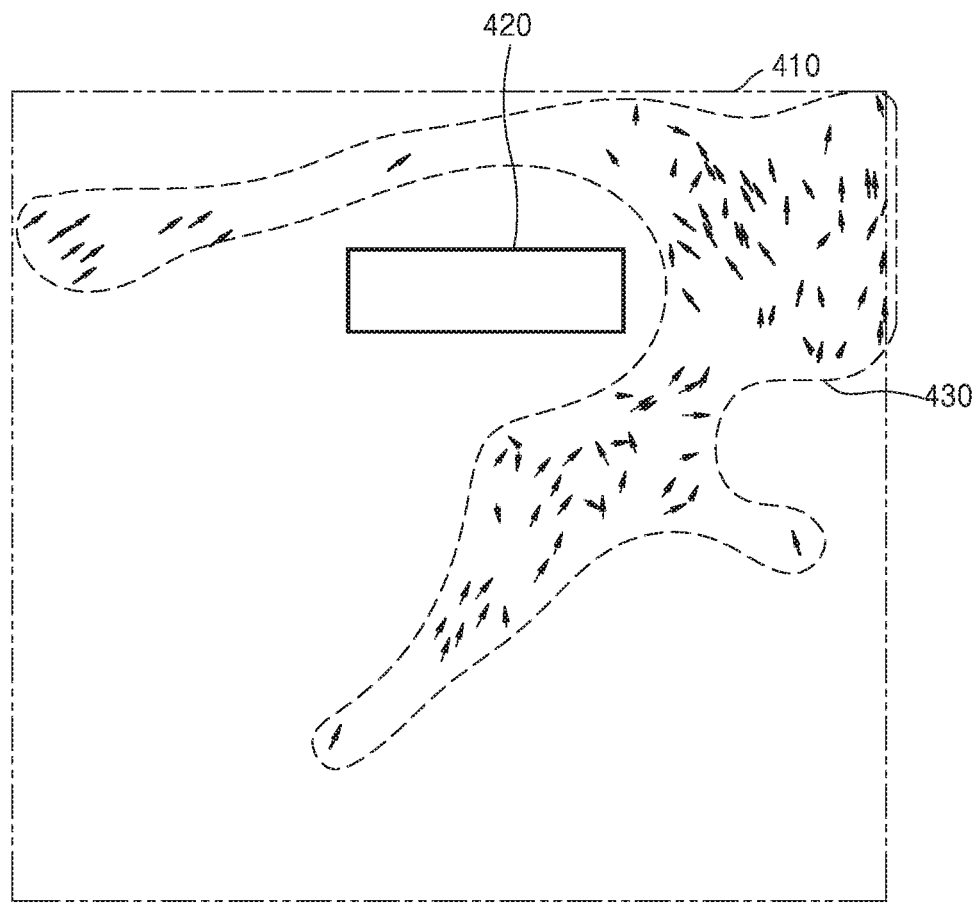
FIG. 4 is a diagram for describing the generation of a virtual vehicle swarm according to an exemplary embodiment.

FIG. 4 is a diagram for describing the generation of a virtual vehicle swarm according to an exemplary embodiment.

Referring to FIG. 4, each of a plurality of virtual vehicles included in a virtual vehicle swarm 430 may be virtually driven based on a vehicle internal condition and/or a vehicle external condition on a map 410 including and/or generated based on current location data.

The vehicle internal condition may be a condition according to driving history data of an actual vehicle and the vehicle external condition may include condition according to a terrain, a road, presence or absence of a moving object 420, and the location and size of the moving object 420 in the map 410 including and/or generated based on the current location data. However, one or more exemplary embodiments are not limited thereto.

A plurality of pieces of path prediction data may include, but are not limited to, results of virtually driving at least one virtual vehicle from a start node to an end node.

Referring back to FIG. 3, the plurality of pieces of path prediction data may be updated. In detail, when the communication interface 210 receives obstacle data regarding a moving object detected on a map, the processor 220 may virtually drive a plurality of virtual vehicles on a map reflecting the obstacle data based on driving history data, thereby updating the plurality of pieces of path prediction data. Hereinafter, updating of a plurality of pieces of path prediction data will be described with reference to FIGS. 5 to 7.

Figure 5:
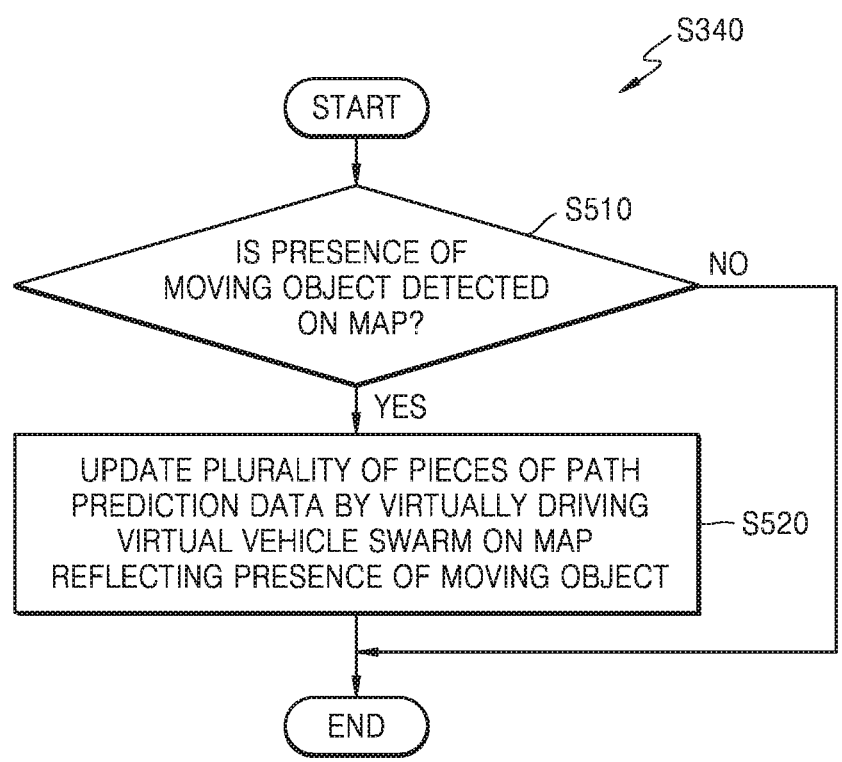
FIGS. 5 and 6 are flowcharts of a method of generating path prediction data, according to an exemplary embodiment.
Figure 6:
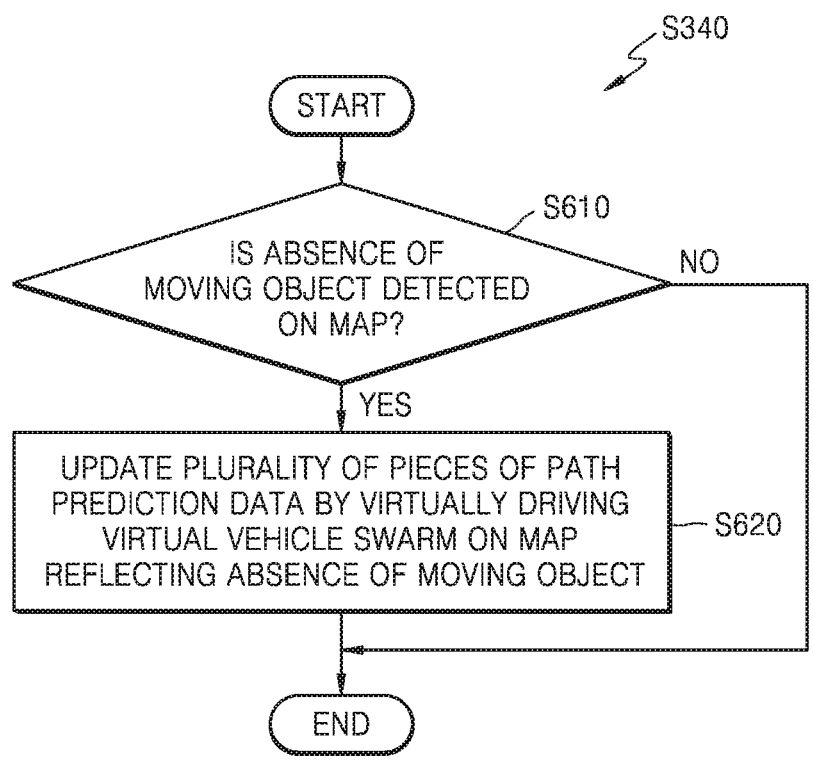

FIGS. 5 and 6 are flowcharts of a method of generating path prediction data, according to one or more exemplary embodiments.

Referring to FIG. 5, when the presence of a moving object on a map is detected based on obstacle data (operation S510), the processor 220 updates a plurality of pieces of path prediction data by virtually driving a virtual vehicle swarm on a map reflecting the presence of the moving object (operation S520).

A case where the presence of a moving object on a map is detected may correspond to, but is not limited to, a case where a moving object that was not in a map including and/or generated based on the current location data appears or a case where a moving object that was present in the map including and/or generated based on the current location data has moved to and appears at a different location.

Referring to FIG. 6, when the absence of a moving object on a map is detected based on obstacle data (operation S610), the processor 220 updates a plurality of pieces of path prediction data by virtually driving a virtual vehicle swarm on a map reflecting the absence of the moving object (operation S620).

A case where the absence of a moving object on a map is detected may correspond to, but is not limited to, a case where a moving object that was in a map including and/or generated based on the current location data disappears or a case where a moving object that was present in the map including and/or generated based on the current location data has moved and disappears from the map.

Figure 7:
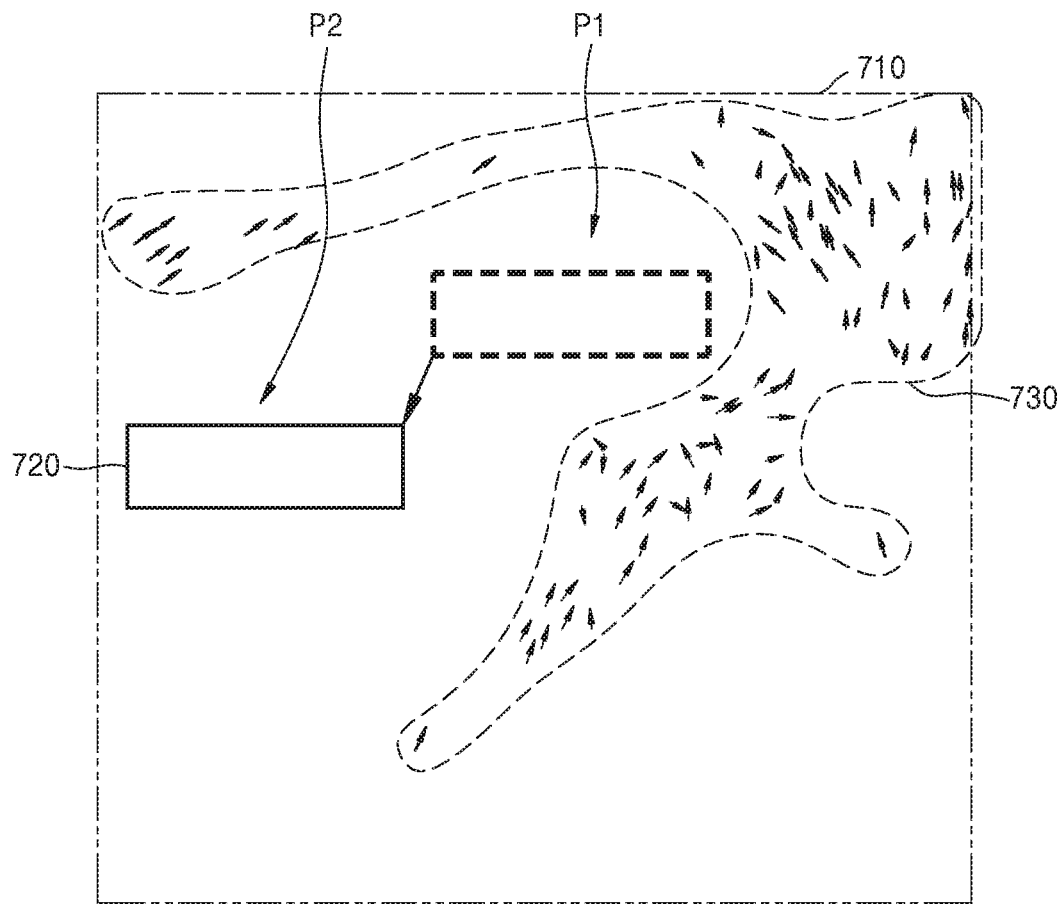
FIG. 7 is a diagram for describing the generation of path prediction data according to an exemplary embodiment.

FIG. 7 is a diagram for describing generation of path prediction data according to an exemplary embodiment.

Referring to FIG. 7, when a moving object 720 moves from a first position P1 to a second position P2, that is, when the absence of the moving object 720 is detected at the first position P1 and the presence of the moving object 720 is detected at the second position P2 in a map including and/or generated based on the current map data, the processor 220 may generate a plurality of pieces of new path prediction data by virtually driving a virtual vehicle swarm 730 on a map 710 reflecting the absence of the moving object 720 at the first position P1 and the presence of the moving object 720 at the second position P2.

Referring back to FIG. 3, when the communication interface 210 receives a path finding command including a departure location and a destination (operation S350) of the actual vehicle, the processor 220 determines optimal path data from among a plurality of pieces of path prediction data based on the departure location and the destination (operation S360).

At this time, the processor 220 may generate optimal path data including an optimal path from among a plurality of pieces of available path prediction data.

The processor 220 may determine optimal path data based on at least one of vector data, moving distance data, moving time data, mission data, or vehicle status data included in each of a plurality of pieces of path prediction data described above. However, one or more exemplary embodiments are not limited thereto.

On the other hand, when a departure location and a destination are included in a map including and/or generated based on current location data and a map reflecting and/or generated based on obstacle data, the processor 220 may determine at least one of a plurality of pieces of available path prediction data as optimal path data.

On the other hand, when at least one of the departure location and the destination is not included in a map including and/or generated based on current location data and a map reflecting and/or generated based on obstacle data, the processor 220 may generate optimal path data including an optimal path by combining path prediction data and path calculation data. Hereinafter, determination and generation of optimal path data using path prediction data and path calculation data will be described with reference to FIGS. 8 and 9.

Figure 8:
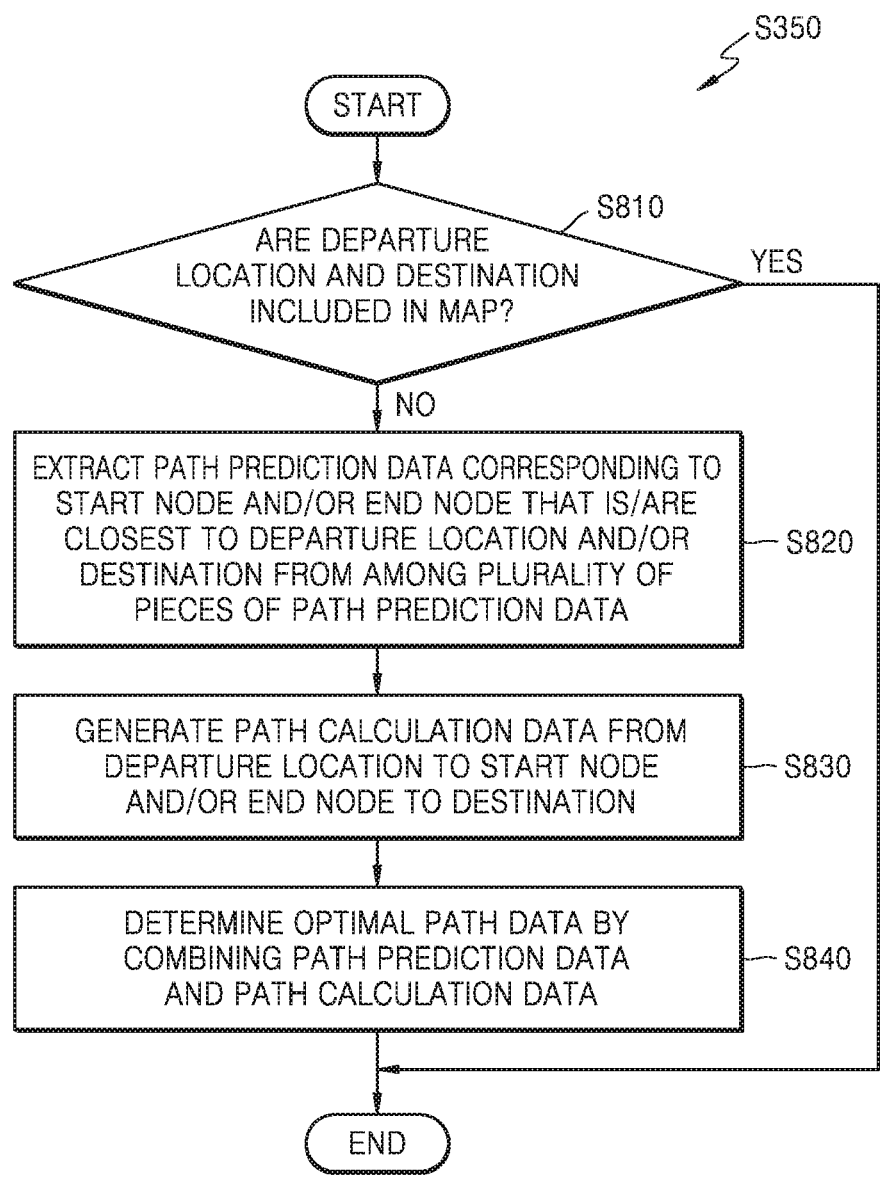
FIG. 8 is a flowchart of a method of determining optimal path data, according to an exemplary embodiment.

FIG. 8 is a flowchart of a method of determining and generating optimal path data, according to an exemplary embodiment.

Figure 9:
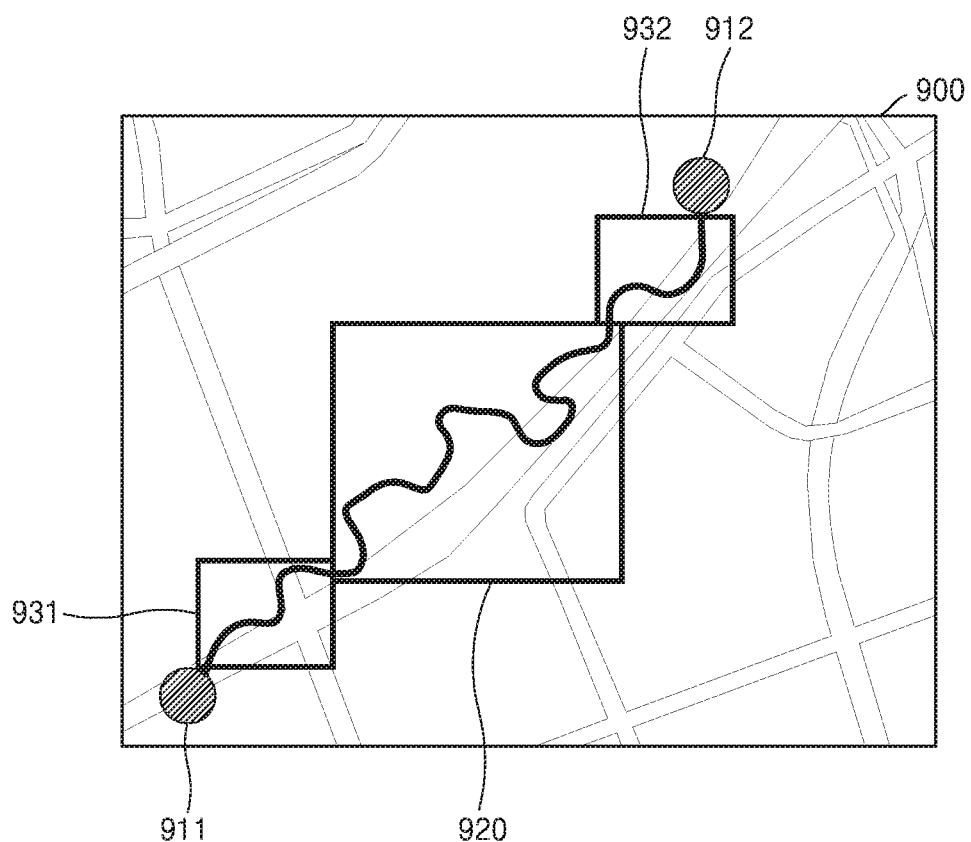
FIG. 9 is a diagram for describing the determination of optimal path data according to an exemplary embodiment.

FIG. 9 is a diagram for describing the determination and generation of optimal path data according to an exemplary embodiment.

Referring to FIGS. 8 and 9, when at least one of a departure location and a destination is not included in the map (operation S810), the processor 220 extracts path prediction data corresponding to a start node and/or an end node that is/are the closest to the departure location and/or the destination, respectively, from among a plurality of pieces of path prediction data (operation S820).

In detail, when a departure location is not included in a map including and/or generated based on current location data and a map reflecting obstacle data, the processor 220 may extract path prediction data corresponding to a start node that is the closest to the departure location from among a plurality of pieces of recent path prediction data.

When a destination is not included in a map including and/or generated based on current location data and a map reflecting and/or generated based on obstacle data, the processor 220 may extract path prediction data corresponding to an end node that is the closest to the destination from among a plurality of pieces of available path prediction data.

When both a departure location and a destination are not included in a map including and/or generated based on current location data and a map reflecting and/or generated based on obstacle data, the processor 220 may extract path prediction data corresponding to a start node that is the closest to the departure location and an end node that is the closest to the destination from among a plurality of pieces of recent path prediction data.

Next, the processor 220 generates path calculation data from the departure location to the start node and/or path calculation data from the end node to the destination (operation S830).

In detail, when a departure location is not included in a map including and/or generated based on current location data and a map reflecting and/or generated based on obstacle data, the processor 220 may generate path calculation data from the departure location to a start node in real time.

When a destination is not included in a map including and/or generated based on the current location data and a map reflecting and/or generated based on the obstacle data, the processor 220 may generate path calculation data from an end node to the destination in real time.

Referring to FIG. 9, when a departure location 911 and a destination 912 are not included in a map 900 including and/or generated based on the current location data and a map reflecting and/or generated based on the obstacle data, the processor 220 may generate path calculation data 931 from the departure location 911 to a start node and path calculation data 932 from an end node to the destination 912 in real time.

Next, the processor 220 determines and generates optimal path data including an optimal path by combining path prediction data and path calculation data (operation S840).

In detail, when a departure location is not included in a map including and/or generated based on current location data and a map reflecting and/or generated based on obstacle data, the processor 220 may determine optimal path data by combining path calculation data from the departure location to a start node and path prediction data from the start node to the destination.

When a destination is not included in a map including and/or generated based on current location data and a map reflecting and/or generated based on obstacle data, the processor 220 may determine optimal path data by combining path prediction data from a departure location to an end node and path calculation data from the end node to the destination.

When both the departure location 911 and the destination 912 are not included in the map 900 including and/or generated based on current location data and the map reflecting and/or generated based on obstacle data, the processor 220 may determine optimal path data by combining the path calculation data 931 from the departure location 911 to a start node, the path prediction data 920 from the start node to an end node, and the path calculation data 932 from the end node to the destination 912.

A method of detecting a moving object according to one or more exemplary embodiments may be implemented as computer-readable code on a computer-readable recording medium. A computer-readable recording medium includes all kinds of recording apparatuses in which data that may be read by a computer system is stored. Examples of the computer-readable recording medium include ROM, RAM, a CD-ROM, magnetic tape, a floppy disk, an optical data storage, etc. The computer-readable recording medium may also be distributed over a networked computer system so that computer-readable code may be stored and executed in a distributed manner. In addition, functional programs, codes, and code segments for implementing one or more exemplary embodiments may be easily inferred by programmers of the technical field to which one or more exemplary embodiments belong.

According to one or more exemplary embodiments, path data that is the most suitable for actual driving of an actual vehicle may be provided.

Furthermore, according to one or more exemplary embodiments, path data may be provided in a faster manner.

Furthermore, according to one or more exemplary embodiments, path data may be provided more accurately.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described above, it will be understood by those of ordinary skill in the art that various changes in form and details may be made therein without departing from the spirit and scope of the disclosure as defined by the following claims.

What is claimed is:

1. A path providing apparatus comprising:
 a communication interface configured to obtain current location data of a vehicle, receive obstacle data of moving objects, and receive a path finding command including a first location and a second location of the vehicle; and
 a processor configured to generate a virtual vehicle swarm comprising a plurality of virtual vehicles, generate a plurality of pieces of path prediction data by virtually driving each of the plurality of virtual vehicles on a first map based on the current location data, update the plurality of pieces of path prediction data by virtually driving each of the plurality of virtual vehicles on a second map based on the obstacle data, and generate optimal path data from among the updated plurality of pieces of path prediction data based on the path finding command including the first location and the second location, and
 wherein the processor is further configured to:
  extract first path prediction data having a start node that is closest to the first location from among the updated plurality of pieces of path prediction data and generate first path calculation data from the first location to the start node when the first location is not included in the first map or the second map,
  extract second path prediction data having an end node that is closest to the second location from among the updated plurality of pieces of path prediction data and generate second path calculation data from the end node to the second location when the second location is not included in the first map or the second map.

2. The path providing apparatus of claim 1, wherein:
 the obstacle data includes data regarding presence or absence of a moving object of the moving objects at a predetermined position being detected, and
 the second map based on the obstacle data includes information on the presence or the absence of the moving object at the predetermined position.

3. The path providing apparatus of claim 1, wherein the processor is configured to:
 generate the optimal path data by combining the first and second path prediction data and the first and second path calculation data.

4. The path providing apparatus of claim 1, wherein the processor is configured to generate the optimal path data based on at least one of vector data, moving distance data, moving time data, mission data, or vehicle status data included in each of the plurality of pieces of path prediction data.

5. The path providing apparatus of claim 1, further comprising a memory configured to store driving history data of the vehicle,
 wherein the processor is configured to generate the plurality of pieces of path prediction data based on the driving history data by virtually driving each of the plurality of virtual vehicles on the first map based on the current location data and is configured to update the plurality of pieces of path prediction data by virtually driving each of the plurality of virtual vehicles on the second map based on the obstacle data.

6. The path providing apparatus of claim 5, wherein the driving history data includes actual path data generated based on actual driving of the vehicle.

7. A path providing method comprising:
obtaining, by a communication interface, current location data of a vehicle;
generating, by a processor, a virtual vehicle swarm comprising a plurality of virtual vehicles;
generating, by the processor, a plurality of pieces of path prediction data by virtually driving each of the plurality of virtual vehicles on a first map based on the current location data;
receiving, by the communication interface, obstacle data of a moving object detected on the first map;
updating, by the processor, the plurality of pieces of path prediction data by virtually driving each of the plurality of virtual vehicles on a second map based on the obstacle data;
receiving, by the communication interface, a path finding command comprising a first location and a second location of the vehicle; and
generating, by the processor, optimal path data from among the updated plurality of pieces of path prediction data based on the path finding command including the first location and the second location,
wherein, based on at least one of the first location and the second location not being included in the first map or the second map, the generating the optimal path data comprises:
extracting first path prediction data including a start node that is closest to the first location from among the updated plurality of pieces of path prediction data based on the first location not being included in the first map or the second map;
extracting second path prediction data including an end node that is closest to the second location from among the updated plurality of pieces of path prediction data when the second location is not included in the first map or the second map;
generating first path calculation data from the first location to the start node based on the first location not being included in the first map or the second map; and
generating second path calculation data from the end node to the second location based on the second location not being included in the first map or the second map.

8. The path providing method of claim 7, wherein:
the obstacle data includes data regarding presence or absence of the moving object at a predetermined position being detected, and
the second map based on the obstacle data includes information on the presence or the absence of the moving object at the predetermined position.

9. The path providing method of claim 7, wherein, based on at least one of the first location and the second location not being included in the first map or the second map, the generating the optimal path data further comprises:
generating the optimal path data by combining the first and second path prediction data and the first and second path calculation data.

10. The path providing method of claim 7, wherein, in the generating the optimal path data, the optimal path data is determined based on at least one of vector data, moving distance data, moving time data, mission data, or vehicle status data included in each of the plurality of pieces of path prediction data.

11. The path providing method of claim 7, further comprising storing, by a memory, driving history data of the vehicle,
wherein:
in the generating the plurality of pieces of path prediction data, the plurality of pieces of path prediction data are generated based on the driving history data by virtually driving each of the plurality of virtual vehicles on the first map based on the current location data, and,
in the updating the plurality of pieces of path prediction data, the plurality of pieces of path prediction data are updated based on the driving history data by virtually driving each of the plurality of virtual vehicles on the second map based on the obstacle data.

12. The path providing method of claim 11, wherein the driving history data includes actual path data generated based on actual driving of the vehicle.

13. A path providing apparatus comprising:
a communication interface configured to obtain current location data of a vehicle at a current location and receive obstacle data of at least one moving object based on the obtained current location data; and
a processor configured to generate a virtual vehicle swarm comprising a plurality of virtual vehicles, generate a plurality of pieces of path prediction data by virtually driving each of the plurality of virtual vehicles on a first map based on the current location data, and update the plurality of pieces of path prediction data by virtually driving each of the plurality of virtual vehicles on a second map based on the obstacle data,
wherein, based on the communication interface receiving a path finding command including a departure location and a destination of the vehicle, the processor is configured to generate optimal path data for the vehicle from among the updated plurality of pieces of path prediction data, and
wherein the processor is further configured to:
extract first path prediction data having a start node that is closest to the current location from among the updated plurality of pieces of path prediction data and generate first path calculation data from the current location to the start node when the current location is not included in the first map or the second map,
extract second path prediction data having an end node that is closest to the departure location from among the updated plurality of pieces of path prediction data and generate second path calculation data from the end node to the departure location when the departure location is not included in the first map or the second map.

14. The path providing apparatus of claim 13, wherein the obstacle data comprises at least one of a position of the at least one moving object and a size of the at least one moving object.

15. The path providing apparatus of claim 13, wherein the second map comprises a map on which a first obstacle that was not in the first map appears, on which a second obstacle in the first map is relocated, or on which a third obstacle that was present in the first map disappears.

16. The path providing apparatus of claim 13, wherein the optimal path data is determined based on at least one of vector data, moving distance data, moving time data, mission data, or vehicle status data included in each of the plurality of pieces of path prediction data.

17. The path providing apparatus of claim 13, further comprising a memory configured to store driving history data of the vehicle,
wherein the processor is configured to generate the plurality of pieces of path prediction data based on the driving history data by virtually driving each of the plurality of virtual vehicles on the first map based on the current location data and is configured to update the plurality of pieces of path prediction data by virtually driving each of the plurality of virtual vehicles on the second map based on the obstacle data.

18. The path providing apparatus of claim 13, wherein the processor is configured to update the plurality of pieces of path prediction data by virtually driving each of the plurality of virtual vehicles on the second map based on absence of the at least one moving object being detected in the second map.

19. The path providing apparatus of claim 18, wherein the absence of the at least one moving object being detected comprises the at least one moving object in the first map disappears in the second map or the at least one moving object that was present in the first map has moved.

20. The path providing apparatus of claim 13, wherein the processor is configured to:
generate the optimal path data by combining the first and second path prediction data and the first and second path calculation data.

* * * * *